United States Patent Office 3,079,432
Patented Feb. 26, 1963

3,079,432
PREPARATION OF AMINO(PHENYL)BORANES
Lowell L. Petterson, Whittier, Robert J. Brotherton, Fullerton, George W. Willcockson, Anaheim, and Allen L. McCloskey, Orange, Calif., assignors to United States Borax & Chemical Corporation, Los Angeles, Calif., a corporation of Nevada
No Drawing. Filed Dec. 4, 1961, Ser. No. 156,944
5 Claims. (Cl. 260—551)

The present invention as indicated has reference to a new and improved method for the preparation of amino(phenyl)boranes.

The products of the present invention have found utility as fuel additives, as base stocks for hydraulic fluids, and as precursors in the preparation of boron containing polymeric materials. Prior methods for preparing these compounds, however, have been inefficient and uneconomical, thereby limiting the extent to which these compounds have been utilized.

It is, therefore, the principal object of this invention to provide an efficient and economically desirable method for the preparation of bis(diorganoamino)phenylboranes and diorganoaminodiphenylboranes.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the method for producing amino(phenyl)boranes which comprises the reaction of an aminohaloborane, a material selected from the group consisting of m-monohalotoluenes, p-monohalotoluenes and monohalobenzenes and a metal having a continuously available active surface, said metal selected from the group consisting of sodium, lithium, potassium, sodium amalgam and sodium-potassium alloys, as follows:

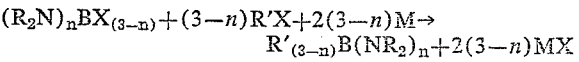

where M is the active metal, X is a halogen selected from the group consisting of chlorine and bromine, R' is selected from the group consisting of phenyl, m- and p-tolyl radicals, R is a radical selected from the group consisting of alkyls of from 1 to 6 carbon atoms, cyclohexyl, benzyl, unsubstituted phenyl and alkyl substituted phenyl, said alkyl substituents having from 1–4 carbon atoms, and where $n$ is an integer of from 1 to 2.

It will be noted in the foregoing broadly stated paragraph that the reducing metal is specifically described as having a continuously available active surface. This is of utmost importance in order for the reaction to proceed and to obtain maximum yields of the desired products. To have a continuously available active surface the metal must be either dispersed in a very small particle size or be in a liquid or molten condition.

It will also be noted that the amino groups of the applicable aminohaloborane reactants are derived from the corresponding secondary amines. The aminohaloborane reactants can be either diaminohaloboranes having the formula $(R_2N)_2BX$, or aminodihaloboranes having the formula $R_2NBX_2$, where R and X are as defined above. The ultimate composition of the product obtained is determined by which of these classes of aminohaloboranes is used as the reactant.

The following list is illustrative of the aminohaloboranes which are applicable to the present invention:

Chlorobis(dimethylamino)borane
Bromobis(diethylamino)borane
Bromobis(di-n-hexylamino)borane
Chlorobis(diphenylamino)borane
Chlorobis(dibenzylamino)borane
Dichloro(dimethylamino)borane
Dibromo(di-n-propylamino)borane
Dibromo(diisoamylamino)borane
Dichloro(dicyclohexylamino)borane
Dibromo(di-p-tolylamino)borane It is to be clearly understood that the foregoing list is only a partial enumeration of the aminohaloborane reactants applicable to the present invention and is not intended to limit the invention.

The third reactant used in the present process can be m- or p-chlorotoluene or m- or p-bromotoluene or one of the unsubstituted monohalogenated benzenes, chlorobenzene or bromobenzene. These are well known compounds which are commercially available or which can be readily synthesized.

So that the present invention can be more clearly understood, the following examples are given for illustrative purposes:

I. A solution of 45.3 grams (0.337 mole) of chlorobis(dimethylamino)borane and 37.9 grams (0.337 mole) of chlorobenzene in 50 ml. of toluene was added over about a 2-hour period to a dispersion of 16.75 grams (0.728 gram-atom) of sodium in 200 ml. of toluene. During the addition step the reaction mass was constantly agitated and its temperature was maintained at from about 0° C. to about 20° C. The reaction mass was then allowed to warm to ambient temperature, and agitation was continued for about an additional 2 hours. The solid precipitate which formed was removed by filtration and chemical analysis showed it to be sodium chloride and excess sodium. The filtrate was then distilled at reduced pressure and 41.7 grams (70.3% yield) of bis(dimethylamino)phenylborane was recovered. Chemical analysis of the product yielded the following data.

Calculated for $C_6H_5B[N(CH_3)_2]_2$: B=6.15%, N=15.90%. Found in product: B=6.14%, N=15.90%.

II. Example I was repeated except that bromobis(dimethylamino)borane was used instead of chlorobis(dimethylamino)borane and finely dispersed potassium was used as the active metal instead of sodium. The results of this example were comparable to those of Example I.

III. A solution of 33.1 grams (0.263 mole) of dichloro(dimethylamino)borane and 65.4 grams (0.581 mole) of chlorobenzene in 50 ml. of aliphatic naphtha was added over about a 2-hour interval to a dispersion of 28.9 grams (1.257 gram-atoms) of sodium in 200 ml. of aliphatic naphtha. During the addition step the reaction mass was constantly agitated and its temperature was maintained at from about 0° C. to about 20° C. The reaction mass was then allowed to warm to ambient temperature, and agitation was continued for about an additional 2 hours. The solid precipitate which formed was removed by filtration and chemical analysis showed it to be sodium chloride and excess sodium. The filtrate was then distilled at reduced pressure and 37.6 grams (68.4% yield) of dimethylamino(diphenyl)borane was recovered. Chemical analysis of the product yielded the following data.

Calculated for $(C_6H_5)_2BN(CH_3)_2$: B=5.17%, N=6.70%. Found in product: B=5.14%, N=6.76%.

IV. Example III was repeated except that dibromo(dimethylamino)borane was used instead of dichloro(dimethylamino)borane, and sodium amalgam was used as the active metal instead of sodium. In this experiment free mercury was separated prior to the distillation of the dimethylamino(diphenyl)borane. The results of this example were comparable to those of Example III.

V. A solution of 54.5 grams (0.128 mole) of bromobis(diphenylamino)borane and 20.1 grams (0.128 mole) of bromobenzene in 50 ml. of toluene was added over about a 2-hour interval to a dispersion of 6.8 grams (0.296 mole) of sodium in 200 ml. of toluene. During the addition step the reaction mass was constantly agitated and its temperature was maintained at from about 0° C. to about 20° C. The reaction mass was then allowed to warm to ambient temperature, and agitation was continued for about an additional hour. The solid precipitate which formed was removed by filtration and chemical analysis showed it to be sodium bromide and excess sodium. The filtrate was then distilled at reduced pressure and 34.0 grams (62.8% yield) of bis(diphenylamino)phenylborane was recovered. Chemical analysis of the porduct yielded the following data.

Calculated for $C_6H_5B[N(C_6H_5)_2]_2$: B=2.55%, N=6.60%. Found in product: B=2.53%, N=6.64%.

VI. Example V was repeated except that finely dispersed lithium was used as the active metal instead of sodium. The results of this example were comparable to those of Example V.

VII. Example I was repeated except that 42.2 grams (0.33 mole) of p-chlorotoluene was used in place of the chlorobenzene. Substantially the same results were obtained, the product being bis(dimethylamino)p-tolylborane.

Other modes of applying the principle of the invention may be employed, change being made as regards the details described, provided the features stated in any of the following claims or the equivalent of such be employed.

We, therefore, particularly point out and distinctly claim as our invention:

1. The method for producing amino(phenyl)boranes which comprises the reaction of an aminohaloborane, a material selected from the group consisting of m-monohalotoluenes, p-monohalotoluenes and monohalobenzenes and a metal which has a continuously available active surface, said metal selected from the group consisting of sodium, lithium, potassium, sodium-potassium alloys and sodium amalgam, as follows:

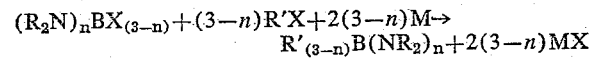

where M is the active metal, X is a halogen selected from the group consisting of chlorine and bromine, R' is selected from the group consisting of phenyl, m- and p-tolyl, R is selected from the group consisting of alkyl of from 1 to 6 carbon atoms, cyclohexyl, benzyl, phenyl and alkyl substituted phenyl said alkyl substituents of from 1–4 carbon atoms, and where $n$ is an integer of from 1–2.

2. The method of preparing bis(dimethylamino)tolylborane which comprises the reaction of a halobis(dimethylamino)borane of the formula $XB[N(CH_3)_2]_2$, p-chlorotoluene of the formula $p-CH_3C_6H_4X$ and a metal which has a continuously available active surface, where X is a halogen selected from the group consisting of chlorine and bromine and said metal is selected from the group consisting of sodium, lithium, potassium, sodium-potassium alloys and sodium amalgam, removing the metal halide and recovering the bis(dimethylamino)tolylborane.

3. The method of preparing dimethylamino(diphenyl)borane which comprises the reaction of a dihalo(dimethylamino)borane of the formula $X_2BN(CH_3)_2$, a monohalobenzene of the formula $C_6H_5X$, and a metal which has a continuously available active surface, where X is a halogen selected from the group consisting of chlorine and bromine and said metal is selected from the group consisting of sodium, lithium, potassium, sodium-potassium alloys and sodium amalgam, removing the metal halide and recovering the dimethylamino(diphenyl)borane.

4. The method of preparing bis(diphenylamino)phenylborane which comprises the reaction of a halobis(diphenylamino)borane of the formula $XB[N(C_6H_5)_2]_2$, a monohalobenzene of the formula $C_6H_5X$, and a metal which has a continuously available active surface, where X is a halogen selected from the group consisting of chlorine and bromine and said metal is selected from the group consisting of sodium, lithium, potassium, sodium-potassium alloys and sodium amalgam, removing the metal halide and recovering the bis(diphenylamino)phenylborane.

5. The method of preparing a bis(dimethylamino)phenylborane which comprises the reaction of a halobis(dimethylamino)borane of the formula $XB[N(CH_3)_2]_2$, a monohalobenzene of the formula $C_6H_5X$, and a metal which has a continuously available active surface, where X is a halogen selected from the group consisting of chlorine and bromine and said metal is selected from the group consisting of sodium, lithium, potassium, sodium-potassium alloys and sodium amalgam, removing the metal halide and recovering the bis(dimethylamino)phenylborane.

No references cited.